United States Patent
Shen

(10) Patent No.: US 12,107,796 B2
(45) Date of Patent: Oct. 1, 2024

(54) CO-EXISTING INTERFERENCE REDUCTION METHOD, COMMUNICATION DEVICE, AND READABLE STORAGE MEDIUM

(71) Applicant: ZTE Corporation, Shenzhen (CN)

(72) Inventor: Shaowu Shen, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 278 days.

(21) Appl. No.: 17/789,591

(22) PCT Filed: Dec. 30, 2020

(86) PCT No.: PCT/CN2020/141627
§ 371 (c)(1),
(2) Date: Jun. 28, 2022

(87) PCT Pub. No.: WO2021/136427
PCT Pub. Date: Jul. 8, 2021

(65) Prior Publication Data
US 2023/0045881 A1    Feb. 16, 2023

(30) Foreign Application Priority Data
Dec. 30, 2019 (CN) .......................... 201911395666.0

(51) Int. Cl.
H04B 17/327    (2015.01)
H04L 5/00      (2006.01)

(52) U.S. Cl.
CPC ......... *H04L 5/0073* (2013.01); *H04B 17/327* (2015.01)

(58) Field of Classification Search
CPC ........ H04B 1/1036; H04B 1/40; H04B 15/00; H04B 17/327; H04L 5/0073
See application file for complete search history.

(56) References Cited

U.S. PATENT DOCUMENTS

| | | | |
|---|---|---|---|
| 2011/0116490 A1 | 5/2011 | Wilhelmsson et al. | |
| 2015/0065064 A1* | 3/2015 | Hwang | H04B 1/525 |
| | | | 455/78 |

FOREIGN PATENT DOCUMENTS

| | | |
|---|---|---|
| CN | 102724671 A | 10/2012 |
| CN | 103391180 A | 11/2013 |

(Continued)

OTHER PUBLICATIONS

International Search Report for corresponding application PCT/CN2020/141627 filed Dec. 30, 2020; Mail date Mar. 19, 2021.

(Continued)

*Primary Examiner* — Melvin C Marcelo
*Assistant Examiner* — Natali Pascual Peguero
(74) *Attorney, Agent, or Firm* — CANTOR COLBURN LLP

(57) ABSTRACT

Provided is a co-existing interference reduction method, which includes: a target wireless communication mode link with a co-existing interference is determined, the co-existing interference including harmonic interference and intermodulation interference; interference scanning detection is performed on the link in a coexistence state so as to obtain values corresponding to a co-existing interference effect evaluation parameter of the link in case of different values of a modulation control parameter; a filtering regulation strategy corresponding to the link is determined according to an interference scanning detection result; and a preset filter module matched with the link is controlled to perform a filtering process according to the filtering regulation strategy so as to reduce a co-existing interference effect on the link.

20 Claims, 6 Drawing Sheets

(56) References Cited

FOREIGN PATENT DOCUMENTS

| | | | |
|---|---|---|---|
| CN | 104025530 | A | 9/2014 |
| CN | 104185187 | A | 12/2014 |
| CN | 104244259 | A | 12/2014 |
| CN | 107113013 | A | 8/2017 |
| CN | 109257065 | A | 1/2019 |
| CN | 109495915 | A | 3/2019 |
| CN | 110366275 | A | 10/2019 |
| CN | 110418417 | A | 11/2019 |
| CN | 112118021 | A | 12/2020 |
| WO | 2011158230 | A2 | 12/2011 |

OTHER PUBLICATIONS

European Search Report for corresponding application EP 2091 0402; Mail date.

* cited by examiner

CO-EXISTING INTERFERENCE REDUCTION METHOD, COMMUNICATION DEVICE, AND READABLE STORAGE MEDIUM

CROSS-REFERENCE TO RELATED APPLICATION

The present disclosure is filed based upon and claims priority to Chinese Patent Application No. 201911395666.0, filed on Dec. 30, 2019, the disclosure of which is hereby incorporated by reference in its entirety.

TECHNICAL FIELD

The present disclosure relates to the technical field of communications, and particularly to a co-existing interference reduction method, a communication device, and a readable storage medium.

BACKGROUND

With the development and evolution of communication terminals, more and more wireless communication mode links and communication bands have been used for communication terminals, and the problem of co-existing interference of communication terminals has also become increasingly complex. Co-existing interferences are mainly reflected by harmonic interference and intermodulation interference between links.

SUMMARY

Embodiments of the present disclosure provide a co-existing interference reduction method, including that: a target wireless communication mode link with a co-existing interference is determined, the co-existing interference including harmonic interference and intermodulation interference; interference scanning detection is performed on the target wireless communication mode link in a coexistence state so as to obtain values corresponding to a co-existing interference effect evaluation parameter of the target wireless communication mode link in case of different values of a modulation control parameter; a filtering regulation strategy corresponding to the target wireless communication mode link is determined according to an interference scanning detection result; and a preset filter module matched with the target wireless communication mode link is controlled to perform a filtering process according to the filtering regulation strategy so as to reduce a co-existing interference effect on the target wireless communication mode link.

The embodiments of the present disclosure also provide a readable storage medium, storing a program that may be executed to implement the steps in the co-existing interference reduction method provided in the first aspect.

The embodiments of the present disclosure also provide a communication device, including: one or more processors; and a memory, storing one or more programs. The one or more programs may be executed by the one or more processors to enable the one or more processors to implement the steps in the co-existing interference reduction method provided in the first aspect.

DETAILED DESCRIPTION OF THE EMBODIMENTS

Figure 1:
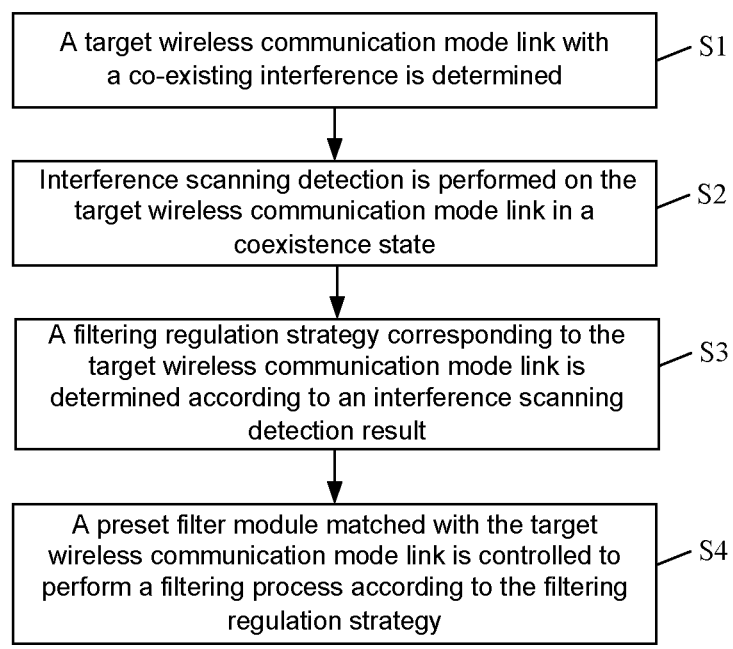
FIG. 1 is a flowchart of a co-existing interference reduction method according to embodiment 1 of the present disclosure.

In order to make the technical solutions of the present disclosure understood by those skilled in the art better, a co-existing interference reduction method, communication device, and readable storage medium provided in the present disclosure will be described below in detail in combination with the drawings.

Exemplary embodiments will be described more completely below with reference to the drawings. However, the exemplary embodiments may be implemented in different forms, and should not be explained as embodiments limited to the descriptions herein. Instead, these embodiments are provided to make the present disclosure thorough and complete, and those skilled in the art understand the scope of the present disclosure adequately.

Terms used herein are only for describing specific embodiments and not intended to limit the present disclosure. For example, singular forms "a/an" and "the" used herein are also intended to cover plural forms, unless otherwise specified in the context. It is also to be understood that terms "include" and/or "prepared from . . . " used in the specification specify the existence of the feature, entirety, step, and/or operation, but do not exclude the existence or addition of one or more other features, entireties, steps, and/or operations.

Unless otherwise defined, all terms (including technical and scientific terms) used herein have the same meanings as commonly understood by those of ordinary skill in the art. It is also to be understood that terms defined in common dictionaries should be explained as having the same meanings as those in the related art and the background of the present disclosure rather than having idealized or over-formalized meanings, unless otherwise defined clearly herein.

In the present disclosure, a communication terminal refers to a device with a communication function, such as a mobile phone, a tablet, and a notebook computer. Exemplary descriptions are made below taking a communication terminal being a 5th-Generation (5G) mobile phone as an example. Wireless communication mode links in the 5G mobile phone generally include a 2nd-Generation (2G) link, a 3rd-Generation (3G) link, a 4th-Generation (4G) link, a 5G link, a Wireless Fidelity (WIFI) link, a Bluetooth link, a millimeter-wave link, etc.

The wireless communication mode link generally includes a transceiver module and an antenna. Certainly, a switch and a frequency divider may further be disposed between the transceiver module and the antenna.

The communication terminal in the present disclosure is in a dual-connectivity or multi-connectivity working state, and it refers to that at least two wireless communication mode links in the communication terminal work simultaneously. For example, the 4G link and the 5G link work simultaneously to form the dual-connectivity working state, and the 4G link, the 5G link, and the WIFI link work simultaneously to form the multi-connectivity working state. The "co-existing interference" in the present disclosure refers to harmonic interference and intermodulation interference formed between the at least two wireless communication mode links at working state when the communication terminal is in the dual-connectivity or multi-connectivity working state.

For example, the 4G link and 5G link in the 5G mobile phone work simultaneously. In such case, if frequency doubling occurs to a working band of the 4G link and a working band of the 5G link, part of frequency points or sub-bands in the 4G link fall within the working band of the 5G link after frequency doubling (such as second harmonic or multiple harmonic), thereby bringing harmonic interference to the 5G link to directly affect the radio frequency performance and data performance of the 5G link. Meanwhile, a frequency point or band of an intermodulation product generated in the 5G link falls within the working band of the 4G link, thereby bringing intermodulation interference to the 4G link to directly affect the radio frequency performance and data performance of the 4G link. The harmonic interference and the intermodulation interference may directly result in sharp deterioration of reception at an interfered frequency point or band, generally referred to as "desense", with a magnitude usually ranging from 0 DB to 30 DB.

FIG. 1 is a flowchart of a co-existing interference reduction method according to embodiment 1 of the present disclosure. As shown in FIG. 1, the co-existing interference reduction method includes the following steps.

In S1, a target wireless communication mode link with a co-existing interference is determined.

Figure 2:
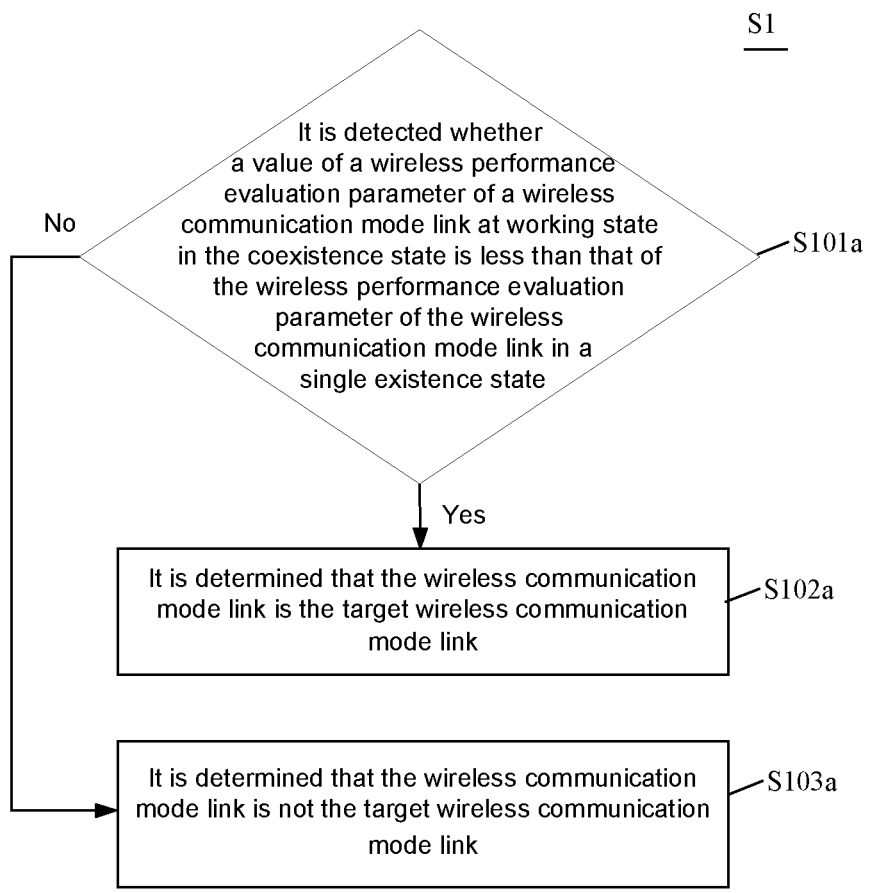
FIG. 2 is a specific implementation flowchart of step S1 according to an embodiment of the present disclosure.

FIG. 2 is a specific implementation flowchart of step S1 according to the present disclosure. As shown in FIG. 2, the step S1 includes the following steps.

In S101a, for each wireless communication mode link at working state, it is detected whether a value of a wireless performance evaluation parameter of the wireless communication mode link in the coexistence state is less than that of the wireless performance evaluation parameter of the wireless communication mode link in a single existence state.

In the S101a, information such as which wireless communication mode links in a terminal are in working state, as well as corresponding working bands and channels, can be detected first through a radio frequency chip and a baseband chip.

Then, a wireless performance evaluation parameter of each wireless communication mode link at work in the communication terminal in a coexistence state is detected.

In some embodiments, the wireless performance evaluation parameter includes at least one of Reference Signal Receiving Power (RSRP), a Received Signal Strength Indication (RSSI), a Carrier to Noise Power Spectrum Density Ratio (CNR), a data throughput, and a Signal-Noise Ratio (SNR). Generally speaking, if values of the RSRP, the RSSI, the CNR, the data throughput, and the SNR are greater, it indicates that the wireless performance of the wireless communication mode link is better.

Next, a value of the wireless performance evaluation parameter of each wireless communication mode link at work in the communication terminal in a single existence state (only one wireless communication mode link is at work) is acquired.

The wireless performance evaluation parameter of each wireless communication mode link at work in the communication terminal in the single existence state may be detected so as to obtain the value of the wireless performance evaluation parameter of each wireless communication mode link in the single existence state. Alternatively, the value of the wireless performance evaluation parameter of each wireless communication mode link in the terminal in the single existence state is obtained by a preliminary test (before a delivery stage), the result is stored in a database of the terminal, and the value of the wireless performance evaluation parameter of each wireless communication mode link at work in the single existence state is directly found from the database when being needed.

Finally, for each wireless communication mode link at work, it is detected whether the value of the wireless performance evaluation parameter of the wireless communication mode link in the coexistence state is less than that of the wireless performance evaluation parameter of the wireless communication mode link in the single existence state.

When it is detected that the value of the wireless performance evaluation parameter of the wireless communication mode link in the coexistence state is less than that of the wireless performance evaluation parameter of the wireless communication mode link in the single existence state, step S102a is performed. Otherwise, step S103a is performed.

In S102a, it is determined that the wireless communication mode link is the target wireless communication mode link.

In S103a, it is determined that the wireless communication mode link is not the target wireless communication mode link.

Figure 3:
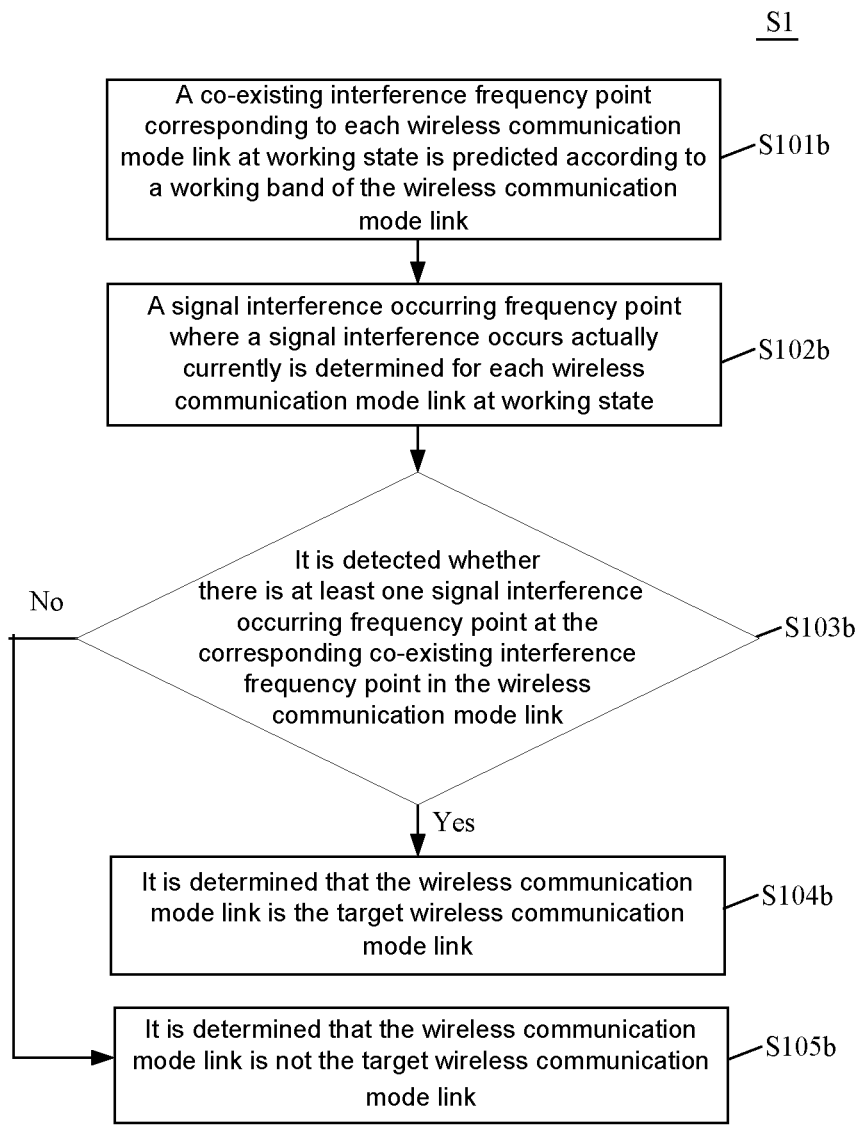
FIG. 3 is another specific implementation flowchart of step S1 according to an embodiment of the present disclosure.

FIG. 3 is another specific implementation flowchart of step S1 according to the present disclosure. As shown in FIG. 3, the step S1 includes the following steps.

In S101b, a co-existing interference frequency point corresponding to each wireless communication mode link at working state is predicted according to a working band of the wireless communication mode link.

In S101b, a co-existing interference frequency point corresponding to each wireless communication mode link at working state may be predicted by any existing multi-band interference coexistence analysis method according to a working band of the wireless communication mode link.

In some cases, intermodulation products of these wireless communication mode links are calculated first, including doubled frequencies, tripled frequencies, as well as sum frequencies, difference frequencies of them, etc., Then, which wireless communication mode links whose present working bands are where these intermodulation products may fall are determined. Finally, for each wireless communication mode link, a frequency point where an intermodulation product falls in the corresponding present working band is determined as a predicted co-existing interference frequency point. These predicted co-existing interference frequency points represent frequency points where the co-existing interference may be generated actually.

In S102b, a signal interference occurring frequency point where a signal interference occurs actually currently is determined for each wireless communication mode link at working state.

In S102b, a signal interference occurring frequency point where a signal interference occurs in the link may be determined by detecting a signal level, signal strength, etc. The determination of the signal interference occurring frequency point in the wireless communication mode link is a conventional technology in this field, and will not be elaborated.

In S103b, for each wireless communication mode link at working state, it is detected whether there is at least one signal interference occurring frequency point at the corresponding co-existing interference frequency point in the wireless communication mode link.

When it is detected that there is at least one signal interference occurring frequency point at the corresponding co-existing interference frequency point in the wireless communication mode link, step S104b is performed. Otherwise, step S105b is performed.

In S104b, it is determined that the wireless communication mode link is the target wireless communication mode link.

In S105b, it is determined that the wireless communication mode link is not the target wireless communication mode link.

Certainly, in the embodiment of the present disclosure, the target wireless communication mode link with the co-existing interference can also be determined by other technical methods, which will not be illustrated one by one herein.

In S2, interference scanning detection is performed on the target wireless communication mode link in a coexistence state.

Figure 4:
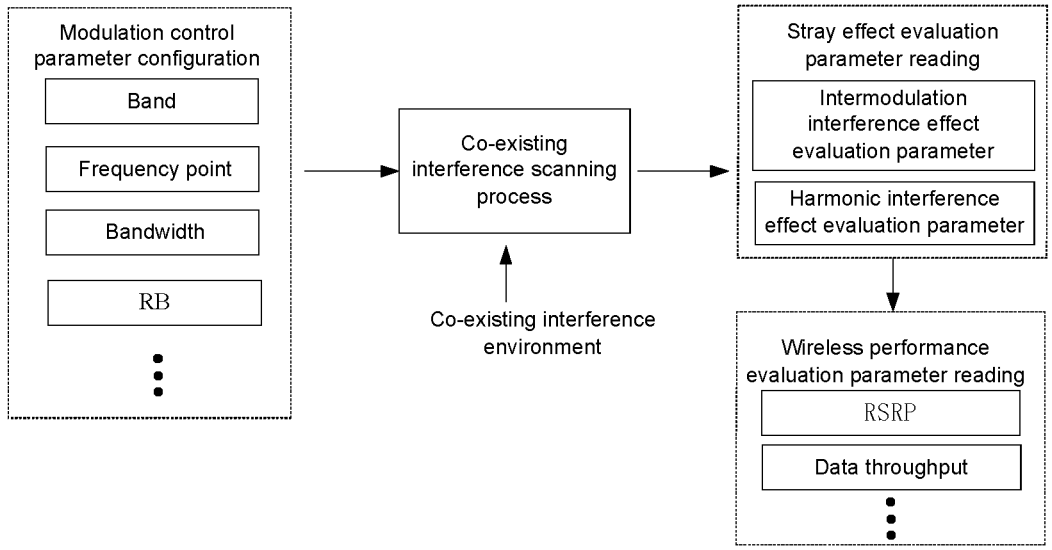
FIG. 4 is a schematic principle diagram of performing interference scanning detection according to an embodiment of the present disclosure.

FIG. 4 is a schematic principle diagram of performing interference scanning detection according to an embodiment of the present disclosure. As shown in FIG. 4, in the step S2, when the communication terminal is currently in a dual-connectivity or multi-connectivity working state, interference scanning detection may be performed on the target wireless communication mode link based on a preset interference scanning process, thereby obtaining values corresponding to a co-existing interference effect evaluation parameter of the target wireless communication mode link in case of different values of a modulation control parameter. The modulation control parameter includes at least one of a band, a frequency point, a bandwidth, and the number of Resource Blocks (RBs). The co-existing interference effect evaluation parameter includes intermodulation interference effect evaluation parameter and harmonic interference effect evaluation parameter.

For example, interference scanning detection is performed on a 4G link and a 5G link in a coexistence state. Here, values of wireless performance evaluation parameters of a first working band of the 4G link and a second working band of the 5G link in the coexistence state are detected based on a mobile self-transmitting and self-receiving Evolved Universal Terrestrial Radio Access (E-UTRA)-New Radio Dual Connectivity (ENDC) harmonic detection algorithm, and a difference calculation process is performed on values of the wireless performance evaluation parameters of the first working band of the 4G link and the second working band of the 5G link in a single existence state respectively, thereby obtaining a value of a co-existing interference effect evaluation parameter of a co-existing interference to the 4G link and a value of a co-existing interference effect evaluation parameter of a co-existing interference to the 5G link when the 4G link is in the first working band and the 5G link is in the second working band.

For example, it is assumed that the 4G link is in the first working band with a signal level measured in the single existence state being −85 DB, and the 5G link is in the second working band with a signal level measured in the single existence state being −85 DB. If it is set that the 4G link is an interfering path and the 5G is an interfered path, and a signal level actually received by the 5G link is −85 DB, it indicates that harmonic interference of the 4G link to the 5G link is 2 DB. If it is set that the 5G link is an interfering path and the 4G link is an interfered path, and a signal level actually received by the 4G link is −90 DB, it indicates that intermodulation interference of the 5G link to the 4G link is 5 DB.

A process of detecting a co-existing interference effect evaluation parameter under multi-connectivity is similar to the above process of detecting a co-existing interference effect evaluation parameter under dual connectivity, and will not be elaborated herein.

It is to be noted that, during interference scanning detection, not only the values corresponding to the co-existing interference effect evaluation parameter of the target wireless communication mode link in case of different values of the modulation control parameter but values of the wireless performance evaluation parameter of the target wireless communication mode link in case of different values of the modulation control parameter may be obtained.

In some embodiments, after the step S2 is completed, the method further includes that: an interference scanning detection result is stored for subsequent query and calling.

In step S3, a filtering regulation strategy corresponding to the target wireless communication mode link is determined according to an interference scanning detection result.

The determination of the filtering regulation strategy corresponding to the target wireless communication mode link in the step S3 not only needs to consider the co-existing interference to the target wireless communication mode link, but also needs to maximally ensure best wireless performance of the target wireless communication mode link.

For example, a configuration solution corresponding to a maximum value of the wireless performance evaluation parameter of the target wireless communication mode link is selected from the interference scanning detection result, and then the filtering regulation strategy is obtained.

When there are two or more target wireless communication mode links, a configuration solution capable of improving the wireless performance of all of the target wireless communication mode links may be selected as practically needed, and then the filtering regulation strategy is obtained.

It is to be noted that a specific process of determining the filtering regulation strategy is not limited in the technical solution of the present disclosure.

In S4, a preset filter module matched with the target wireless communication mode link is controlled to perform a filtering process according to the filtering regulation strategy so as to reduce a co-existing interference effect on the target wireless communication mode link.

Figure 5:
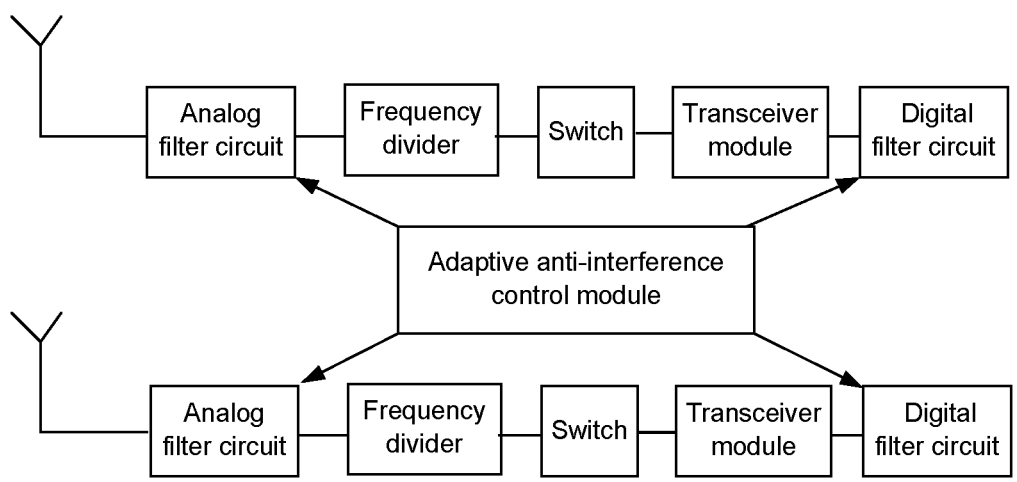
FIG. 5 is a schematic diagram of a circuit result of configuring a corresponding preset filter module for a wireless communication mode link according to an embodiment of the present disclosure.

FIG. 5 is a schematic diagram of a circuit result of configuring a corresponding preset filter module for a wireless communication mode link according to an embodiment of the present disclosure. As shown in FIG. 5, in the present disclosure, a corresponding preset filter module is pre-configured for each wireless communication mode link in the communication terminal.

In some embodiments, the preset filter module includes an analog filter circuit and a digital filter. The analog filter circuit has relatively high filter performance when filtering continuous bands. The digital filter has relatively high filter performance when filtering discrete frequency points.

The wireless communication mode link includes an antenna and a transceiver module. The analog filter circuit is located between the antenna and the transceiver module. The digital filter is integrated into the transceiver module, or arranged outside the transceiver module and connected with the transceiver module. Certainly, the wireless communication mode link may further include a distributor and a switch. It is to be noted that the FIG. 5 only shows the condition that the analog filter circuit is located between the distributor and the antenna as an example.

These preset filter modules are controlled by an adaptive anti-interference control module in a unified manner. The adaptive anti-interference control module is a running-program-based virtual function module capable of implementing the step S4.

In some embodiments, the filtering regulation strategy determined in the step S3 includes filtering at least one target sub-band in a working band of the target wireless communication mode link. In such case, the step S4 specifically includes that: the analog filter circuit matched with the target wireless communication mode link is controlled to perform a filtering process on the target sub-band.

In some embodiments, the filtering regulation strategy determined in the step S3 includes filtering at least one target frequency in a working band of the target wireless communication mode link. In such case, the step S4 specifically includes that: the digital filter matched with the target wireless communication mode link is controlled to perform a filtering process on the target frequency.

In practical applications, only the analog filter circuit needs to perform a filtering process, or only the digital filter needs to perform a filtering process, or the analog filter circuit and the digital filter need to perform a filtering process cooperatively.

According to the technical solution of the embodiment of the present disclosure, interference scanning detection is performed on a target wireless communication mode link in a coexistence state so as to obtain values corresponding to a co-existing interference effect evaluation parameter of the target wireless communication mode link in case of different values of a modulation control parameter. Then, a filtering regulation strategy corresponding to the target wireless communication mode link is determined according to an interference scanning detection result, and the preset filter module matched with the target wireless communication mode link is controlled to perform a filtering process according to the filtering regulation strategy, so as to reduce a co-existing interference effect on the target wireless communication mode link and further help to improve the throughput of the target wireless communication mode link.

Figure 6:
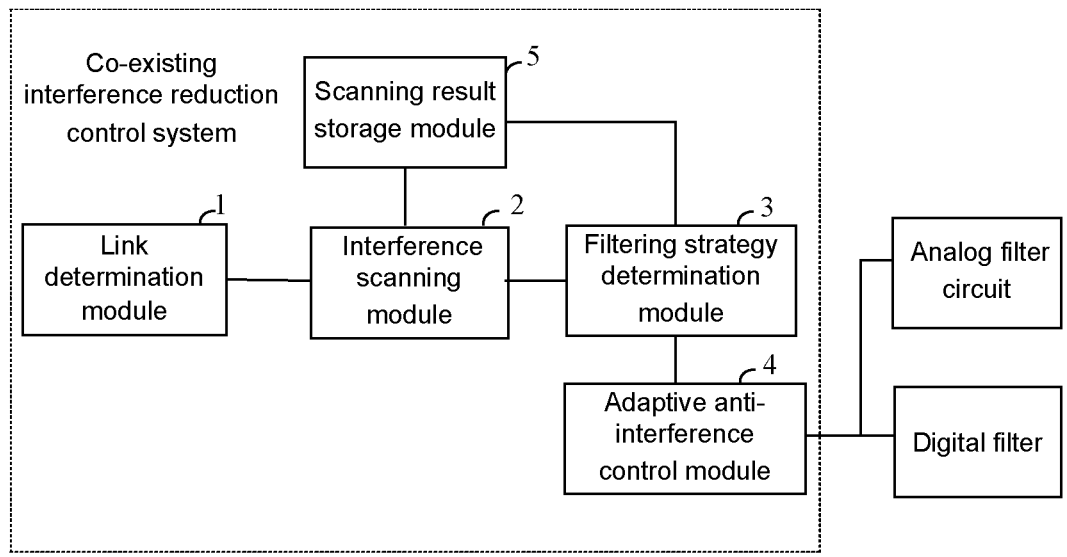
FIG. 6 is a functional structural block diagram of a communication device according to an embodiment of the present disclosure.

FIG. 6 is a functional structural block diagram of a communication device according to an embodiment of the present disclosure. As shown in FIG. 6, the communication device includes one or more processors and a memory. One or more programs are stored in the memory. The one or more programs are executed by the one or more processors to enable the one or more processors to implement the steps in the co-existing interference reduction method provided in the above-mentioned embodiment.

In the present embodiment, the processor is equivalent to a virtual co-existing interference reduction system when running the program in the memory. The co-existing interference reduction system includes the following virtual function modules: a link determination module 1, an interference scanning module 2, a scanning result storage module 5, a filtering strategy determination module 3, and an adaptive anti-interference control module 4.

The link determination module 1 is configured to determine a target wireless communication mode link with a co-existing interference. That is, the module may implement the step S1 in the above-mentioned embodiment.

The interference scanning module 2 is configured to perform interference scanning detection on the target wireless communication mode link in a coexistence state. That is, the module may implement the step S2 in the above-mentioned embodiment.

The scanning result storage module 5 is configured to store a detection result of interference scanning detection of the interference scanning module 2.

The filtering strategy determination module 3 is configured to determine a filtering regulation strategy corresponding to the target wireless communication mode link according to the interference scanning detection result. That is, the module may implement the step S3 in the above-mentioned embodiment.

The adaptive anti-interference control module 4 is configured to control a preset filter module matched with the target wireless communication mode link to perform a filtering process according to the filtering regulation strategy so as to reduce a co-existing interference effect on the target wireless communication mode link. That is, the module implements the step S4 in the above-mentioned embodiment.

Besides the above function modules, the communication device further includes the preset filter module configured for each wireless communication mode link.

In some embodiments, the preset filter module includes an analog filter circuit and a digital filter. The wireless communication mode link includes an antenna and a transceiver module. The analog filter circuit is located between the antenna and the transceiver module. The digital filter is integrated into the transceiver module, or arranged outside the transceiver module and connected with the transceiver module.

The analog filter circuit is configured to perform an analog filtering process on a received signal in response to a control instruction transmitted by the adaptive anti-interference control module 4. In the embodiment of the present disclosure, narrow-band or sub-band filtering regulation within a working band may be performed according to a center frequency point and a bandwidth to regulate a filtering sub-band range of the analog filter circuit into a bandwidth capable of covering an interfering frequency point and a network requirement (such as a throughput requirement). For example, if the working band of the whole link is f, f may be divided into totally n sub-band ranges f1, f2, f3, . . . fn, each sub-band range corresponding to a set of control instructions, and these filtering sub-bands and the corresponding control instructions thereof may be stored in a parameter storage module. In practical applications, the control instruction corresponding to a sub-band to be filtered may be called in real time as currently needed.

Figure 7:
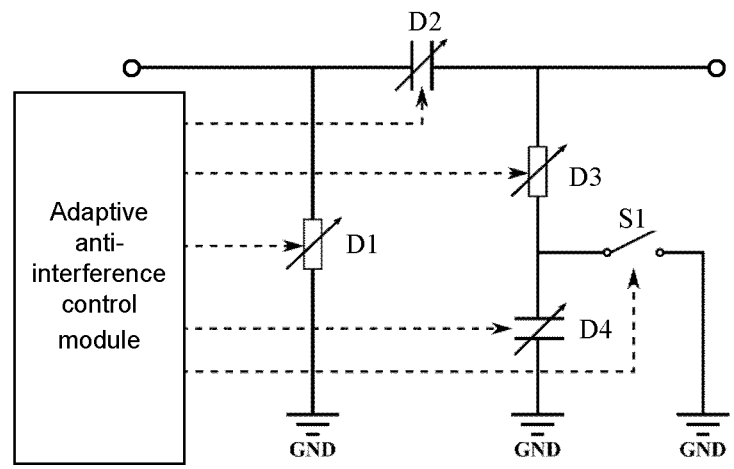
FIG. 7 is a schematic diagram of a circuit structure of an analog filter circuit according to an embodiment of the present disclosure.

FIG. 7 is a schematic diagram of a circuit structure of an analog filter circuit according to an embodiment of the present disclosure. As shown in FIG. 7, the analog filter circuit includes a first adjustable filter element D1, a second adjustable filter element D2, a third adjustable filter element D3, a fourth adjustable filter element D4, and a switching circuit.

A first end of the first adjustable filter element D1 is grounded, and a second end of the first adjustable filter element D1 is connected with a first end of the analog filter circuit. A first end of the second adjustable filter element D2 is connected with the first tend of the analog filter circuit, and a second end of the second adjustable filter element D2 is connected with a second end of the analog filter circuit. A first tend of the third adjustable filter element D3 is connected with the second end of the analog filter circuit, a second end of the third adjustable filter element D3 is connected with a first end of the fourth adjustable filter element D4 and a first end of a first switching circuit S1. A second end of the fourth adjustable filter element D4 is grounded, and a second end of the first switching circuit S1 is grounded.

Each of the adjustable filter elements may be independently selected from a passive filter element such as an adjustable resistor, an adjustable inductor, and an adjustable capacitor, or a Micro-Electro Mechanical System (MEMS) element.

FIG. 7 only shows the condition that the first adjustable filter element D1 and the fourth adjustable filter element D4 are adjustable inductors and the second adjustable filter element D2 and the third adjustable filter element D3 are adjustable capacitors as an example. These adjustable filter elements and the first switching circuit S1 may be independently controlled by control instructions transmitted by the adaptive anti-interference control module respectively.

Figure 8:
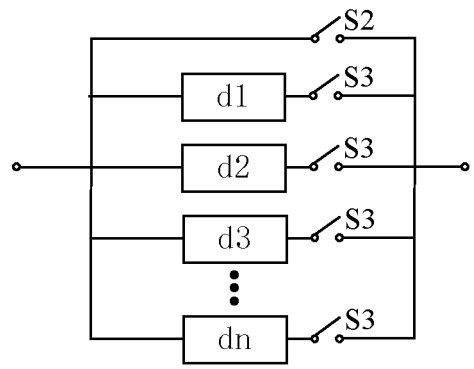
FIG. 8 is another schematic diagram of a circuit structure of an analog filter circuit according to an embodiment of the present disclosure.

FIG. 8 is another schematic diagram of a circuit structure of an analog filter circuit according to an embodiment of the present disclosure. As shown in FIG. 8, the analog filter circuit includes a direct branch and at least two filter branches that are connected in parallel.

The direct branch includes a second switching circuit S2, a first end of the second switching circuit S2 is connected with a first end of the analog filter circuit, and a second end of the second switching circuit S2 is connected with a second end of the analog filter circuit. When it is unnecessary to perform analog filtering on a signal, the second switching circuit S2 may be controlled to be switched on such that the signal directly passes by.

The filter branch includes a third switching circuit S3 and a sub-band filter circuit. A first end of the sub-band filter circuit is connected with the first end of the analog filter circuit, a second end of the sub-band filter circuit d1/d2/d3 . . . /dn is connected with a first end of the third switching circuit S3, and a second end of the third switching circuit S3 is connected with the second end of the analog filter circuit. Each sub-band filter circuit d1/d2/d3 . . . /dn is configured with a corresponding filtering sub-band (which may be controlled and regulated by the adaptive anti-interference control module 4) f1, f2, f3, fn, and when the third switching circuit S3 connected therewith is switched on in response to control of the adaptive anti-interference control module 4, can perform a filtering process on a signal passing by.

Figure 9:
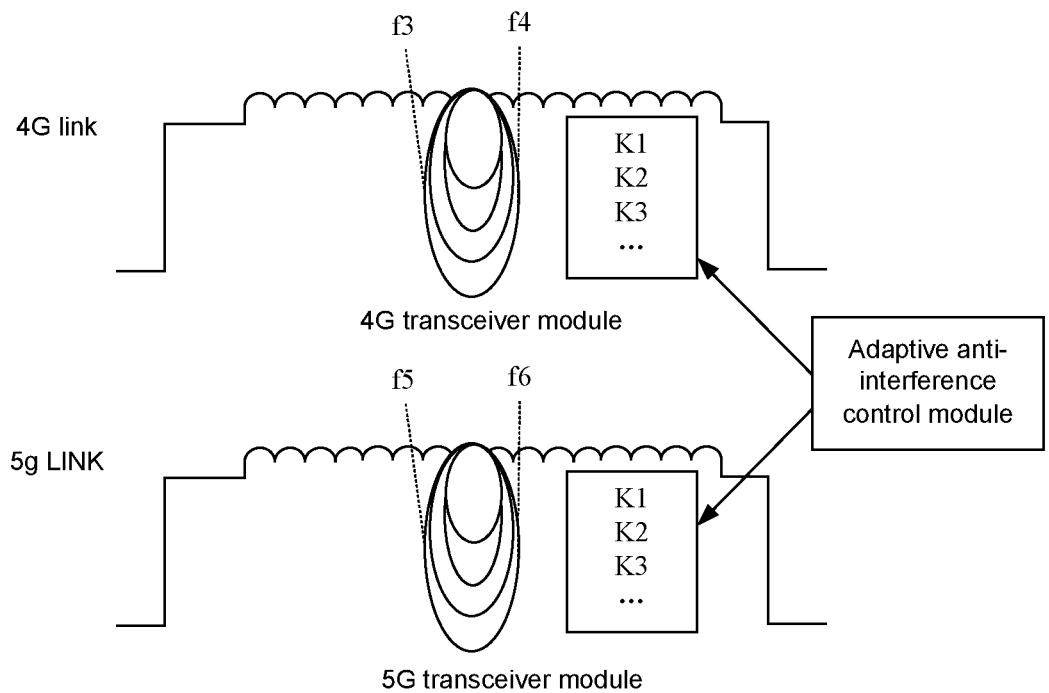
FIG. 9 is a principle diagram of performing digital filtering according to an embodiment of the present disclosure.

FIG. 9 is a principle diagram of performing digital filtering according to an embodiment of the present disclosure. As shown in FIG. 9, the digital filter is configured to perform a digital filtering process on a signal in response to a control instruction transmitted by the adaptive anti-interference control module 4. The adaptive anti-interference control module 4 transmits a control instruction to control a filtering parameter of the digital filter configured for the target wireless communication mode link to change a K value therein. The K value represents a depth of a built-in trap filter. If the K value is greater, a filtering depth is greater, namely an interference suppression effect of a corresponding frequency point is better.

FIG. 9 shows an application scenario of digital filtering of a 4G link and a 5G link in a coexistence state. A working band of the 4G link is f3 to f4, and a working band of the 5G link is f5 to f6. There is a corresponding harmonic and intermodulation relationship, i.e., a co-existing interference, between the two working bands. In such case, bandwidths of the two working bands are unchangeable, and a digital coexistence filtering control program may be started to regulate a K value of the digital filter on the 4G side, or the 5G side, or both sides to change a filtering depth thereof, namely changing a suppression value, until the co-existing interference between the 4G link and the 5G link satisfies a set condition.

The embodiments of the present disclosure also provide a readable storage medium, storing a program that is executed to implement the steps in the co-existing interference reduction method provided in the above-mentioned embodiment.

It can be understood by those of ordinary skill in the art that all or some steps in the method disclosed above and function modules/units in the device may be implemented as software, firmware, hardware, or a proper combination thereof. In a hardware implementation mode, division of the function modules/units mentioned in the above descriptions does not necessarily correspond to division of physical components. For example, a physical component may have multiple functions, or a function or step may be executed cooperatively by a plurality of physical components. Some physical components or all physical components may be implemented as software executed by a processor, such as a central processing unit, a digital signal processor, or a microprocessor, or implemented as hardware, or implemented as integrated circuits, such as application specific integrated circuits. Such software may be distributed in a computer-readable medium that may include a computer storage medium (or a non-transitory medium) and a communication medium (or a temporary medium). As known to those of ordinary skill in the art, term computer storage medium includes volatile, nonvolatile, removable, and irremovable media implemented in any method or technology for storing information (such as computer-readable instructions, data structures, program modules, or other data). The computer storage medium includes, but is not limited to, a Random Access Memory (RAM), a Read-Only Memory (ROM), an Electrically Erasable Programmable ROM (EEPROM), a flash memory or another memory technology, a Compact Disc Read-Only Memory (CD-ROM), a Digital Video Disk (DVD) or another optical disk memory, a cassette, a magnetic tape, a disk memory or another magnetic memory device, or any other medium that may be configured to store desired information and is accessible for a computer. In addition, it is known to those of ordinary skill in the art that the communication medium usually includes a computer-readable instruction, a data structure, a program module, or other data in modulated data signals of, for example, a carrier or another transmission mechanism, and may include any information delivery medium.

The exemplary embodiments have been disclosed herein. Specific terms are used, but they are only used and explained as general descriptive meanings rather than limitations. In some instances, it is apparent to those skilled in the art that, unless otherwise specified, features, properties, and/or elements described in combination with specific embodiments may be used independently or in combination with features, properties, and/or elements described in combination with other embodiments. Therefore, it can be understood by those skilled in the art that various variations in form and detail may be made without departing from the scope of the present disclosure described in the appended claims.

What is claimed is:

1. A method for reducing co-existing interference, comprising:
   determining a target wireless communication mode link with a co-existing interference, the co-existing interference comprising harmonic interference and intermodulation interference;
   performing interference scanning detection on the target wireless communication mode link in a coexistence state so as to obtain values corresponding to a co-existing interference effect evaluation parameter of the target wireless communication mode link in case of different values of a modulation control parameter;
   determining a filtering regulation strategy corresponding to the target wireless communication mode link according to an interference scanning detection result; and
   controlling a preset filter module matched with the target wireless communication mode link to perform a filtering process according to the filtering regulation strategy so as to reduce a co-existing interference effect on the target wireless communication mode link.

2. The method according to claim 1, wherein the step of determining a target wireless communication mode link with a co-existing interference comprises:
   detecting, for each wireless communication mode link at work, whether a value of a wireless performance evaluation parameter of the wireless communication mode link in the coexistence state is less than that of the wireless performance evaluation parameter of the wireless communication mode link in a single existence state; and
   determining that the wireless communication mode link is the target wireless communication mode link in case of detecting that the value of the wireless performance evaluation parameter of the wireless communication mode link in the coexistence state is less than that of the wireless performance evaluation parameter of the wireless communication mode link in the single existence state.

3. The method according to claim 2, wherein the wireless performance evaluation parameter comprises at least one of Reference Signal Receiving Power (RSRP), a Received Signal Strength Indication (RSSI), a Carrier to Noise Power Spectrum Density Ratio (CNR), a data throughput, and a Signal-Noise Ratio (SNR).

4. A communication device, comprising:
   one or more processors; and
   a memory, storing one or more programs,
   wherein the one or more programs are executed by the one or more processors to enable the one or more processors to implement the steps of the method as claimed in claim 3.

5. A communication device, comprising:
   one or more processors; and
   a memory, storing one or more programs,
   wherein the one or more programs are executed by the one or more processors to enable the one or more processors to implement the steps of the method as claimed in claim 2.

6. The method according to claim 1, wherein the step of determining a target wireless communication mode link with a co-existing interference comprises:
   predicting a co-existing interference frequency point corresponding to each wireless communication mode link according to a working band of the wireless communication mode link at a working state;
   detecting, for each wireless communication mode link at the working state with a signal interference, whether there is at least one signal interference occurring frequency point at the corresponding co-existing interference frequency point in the wireless communication mode link; and
   determining that the wireless communication mode link is the target wireless communication mode link in case of detecting that there is at least one signal interference occurring frequency point at the corresponding co-existing interference frequency point in the wireless communication mode link.

7. A communication device, comprising:
   one or more processors; and
   a memory, storing one or more programs,
   wherein the one or more programs are executed by the one or more processors to enable the one or more processors to implement the steps of the method as claimed in claim 6.

8. The method according to claim 1, wherein the filtering regulation strategy comprises filtering at least one target sub-band in a working band of the target wireless communication mode link; the preset filter module comprises an analog filter circuit; and
   the step of controlling a preset filter module matched with the target wireless communication mode link to perform a filtering process according to the filtering regulation strategy comprises:
   controlling the analog filter circuit matched with the target wireless communication mode link to perform a filtering process on the target sub-band.

9. A communication device, comprising:
   one or more processors; and
   a memory, storing one or more programs,
   wherein the one or more programs are executed by the one or more processors to enable the one or more processors to implement the steps of the method as claimed in claim 8.

10. The method according to claim 1, wherein the filtering regulation strategy comprises filtering at least one target frequency in a working band of the target wireless communication mode link; the preset filter module comprises a digital filter; and
    the step of controlling a preset filter module matched with the target wireless communication mode link to perform a filtering process according to the filtering regulation strategy comprises:
    controlling the digital filter matched with the target wireless communication mode link to perform a filtering process on the target frequency.

11. A communication device, comprising:
    one or more processors; and
    a memory, storing one or more programs,
    wherein the one or more programs are executed by the one or more processors to enable the one or more processors to implement the steps of the method as claimed in claim 10.

12. The method according to claim 1, after the step of performing interference scanning detection on the target wireless communication mode link in a coexistence state and before the step of determining a filtering regulation strategy corresponding to the target wireless communication mode link according to an interference scanning detection result, further comprising:

storing the interference scanning detection result.

13. A communication device, comprising:
one or more processors; and
a memory, storing one or more programs,
wherein the one or more programs are executed by the one or more processors to enable the one or more processors to implement the steps of the method as claimed in claim 12.

14. The method according to claim 1, wherein the modulation control parameter comprises at least one of a band, a bandwidth, a frequency point, and the number of Resource Blocks (RBs).

15. A non-transitory computer readable storage medium, storing a program that is executed to implement the steps of the method as claimed in claim 1.

16. A communication device, comprising:
one or more processors; and
a memory, storing one or more programs,
wherein the one or more programs are executed by the one or more processors to enable the one or more processors to implement the steps of the method as claimed in claim 1.

17. The communication device according to claim 16, further comprising: a preset filter module configured for each wireless communication mode link.

18. The communication device according to claim 17, wherein the preset filter module comprises an analog filter circuit and a digital filter;
the wireless communication mode link comprises an antenna and a transceiver module;
the analog filter circuit is located between the antenna and the transceiver module; and
the digital filter is integrated in the transceiver module, or arranged outside the transceiver module and connected with the transceiver module.

19. The communication device according to claim 18, wherein the analog filter circuit comprises a first adjustable filter element, a second adjustable filter element, a third adjustable filter element, a fourth adjustable filter element, and a first switching circuit;
a first end of the first adjustable filter element is grounded, and a second end of the first adjustable filter element is connected with a first end of the analog filter circuit;
a first end of the second adjustable filter element is connected with the first end of the analog filter circuit, and a second end of the second adjustable filter element is connected with a second end of the analog filter circuit;
a first end of the third adjustable filter element is connected with the second end of the analog filter circuit, and a second end of the third adjustable filter element is connected with a first end of the fourth adjustable filter element and a first end of the first switching circuit; and
a second end of the fourth adjustable filter element is grounded, and a second end of the first switching circuit is grounded.

20. The communication device according to claim 18, wherein the analog filter circuit comprises a direct branch and at least two filter branches that are connected in parallel;
the direct branch comprises a second switching circuit; a first end of the second switching circuit is connected with a first end of the analog filter circuit, and a second end of the second switching circuit is connected with a second end of the analog filter circuit;
the filter branch comprises a third switching circuit and a sub-band filter circuit; and a first end of the sub-band filter circuit is connected with the first end of the analog filter circuit, a second end of the sub-band filter circuit is connected with a first end of the third switching circuit, and a second end of the third switching circuit is connected with the second end of the analog filter circuit.

* * * * *